(No Model.) 2 Sheets—Sheet 1.
J. M. DAVIDSON.
FILTER.
No. 544,566. Patented Aug. 13, 1895.
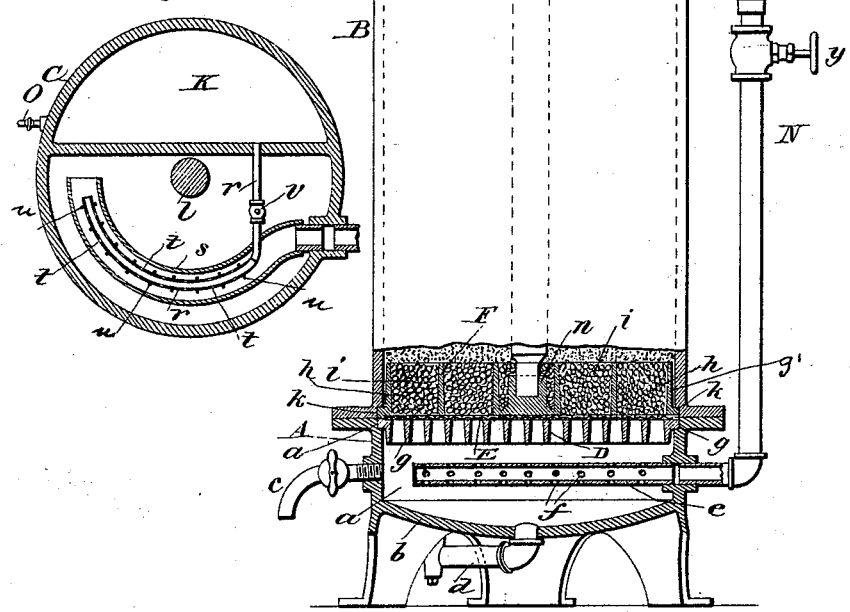
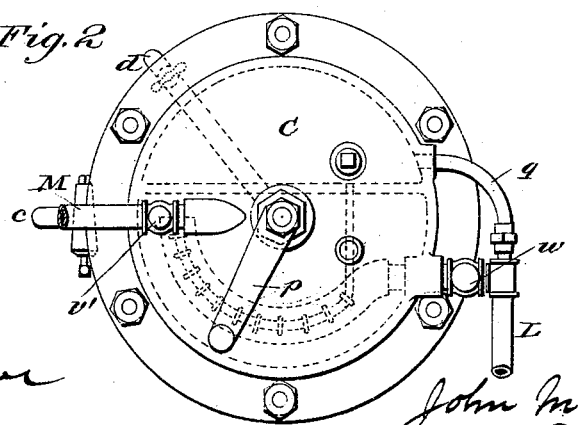
Witnesses:
J. F. Coleman
W. E. Peirce
Inventor
John M. Davidson
By D. P. Reinöhl
Atty.

(No Model.) 2 Sheets—Sheet 2.
J. M. DAVIDSON.
FILTER.
No. 544,566. Patented Aug. 13, 1895.
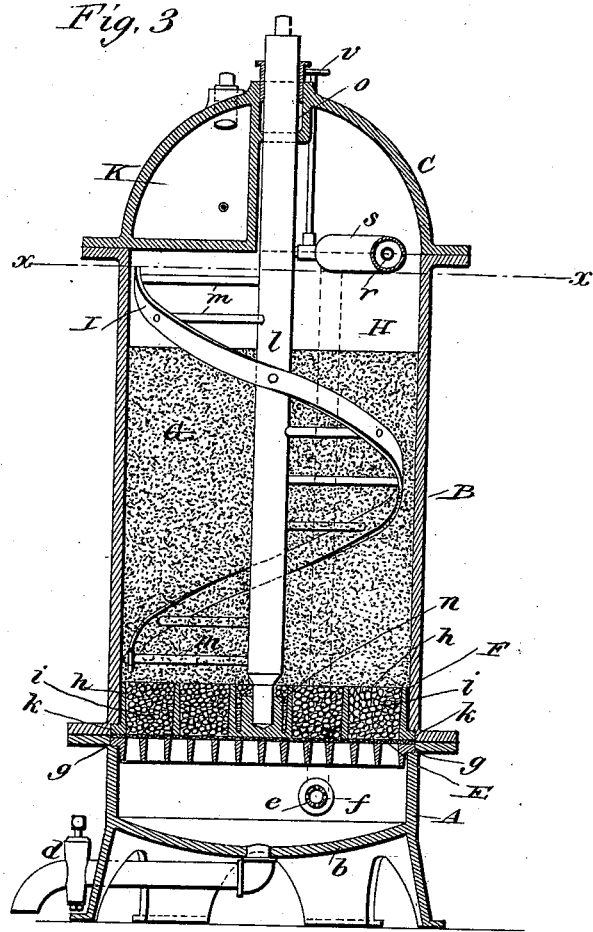
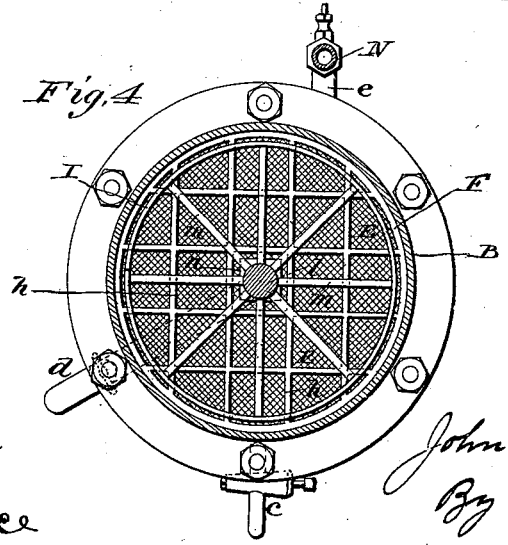
Witnesses:
J. P. Coleman
W. E. Peirce
Inventor
John M. Davidson
By D. L. Reinohl
Atty

UNITED STATES PATENT OFFICE.

JOHN M. DAVIDSON, OF ALLEGHENY, PENNSYLVANIA, ASSIGNOR OF ONE-HALF TO JOSEPH McNAUGHER, JR., OF SAME PLACE.

FILTER.

SPECIFICATION forming part of Letters Patent No. 544,566, dated August 13, 1895.

Application filed November 22, 1893. Serial No. 491,641. (No model.)

*To all whom it may concern:*

Be it known that I, JOHN M. DAVIDSON, a citizen of the United States, residing at Allegheny, in the county of Allegheny and State of Pennsylvania, have invented certain new and useful Improvements in Filters; and I do hereby declare the following to be a full, clear, and exact description of the invention, such as will enable others skilled in the art to which it appertains to make and use the same.

My present invention relates to filters, and has for its object certain improvements in construction, which will be fully disclosed in the following specification and claims.

In filtering water impregnated with lime or oxide of iron the material of which the filter-bed is composed adheres to the wall of the filtering-chamber and forms a coating or incrustation which accumulates to such an extent as to seriously affect the operation of filtering by reducing the capacity of the filtering-chamber, and requires forcible removal by the use of a hammer and chisel, and to do which necessitates the removal of the head of the filter and the stopping of the work of filtering. This accumulation on the wall of the filtering-chamber is due to the fact that the agitators used do not loosen the filter-bed from the wall of the filtering-chamber. This incrustation also attacks and accumulates upon the wire strainer at the bottom of the filtering-chamber upon which the filtering material rests and destroys the strainer. To prevent the sand of which filter-beds are usually composed coming in contact with the strainer, a layer of pebbles has been interposed between the strainer and the filter-bed; but in the practical operation of filters when the current of the water is reversed to cleanse the filter-bed the pressure of the water frequently displaces the pebbles and the sand gravitates down upon the strainer, and, as hereinbefore stated, incrusts upon and destroys the strainer. To remedy these defects I provide an agitator so constructed as to shear off or loosen the filtering material from the wall of the filtering-chamber while the filter-bed is being cleansed, and provide a pebble-receptacle having a series of chambers or compartments open at both ends, and in which the pebbles are retained and secured against lateral displacement.

Another difficulty encountered has been that in rapid filtering with the use of a chemical or chemicals to produce coagulation of the impurities contained in the water the coagulation has not been as thorough and affective as it should have been, owing to the fact that the chemical has not been properly intermingled with or diffused in the water as it passed through the supply-pipe, and after entering the filtering-chamber the water becomes static and no intermingling of the coagulant and the water takes place. It is my purpose to produce a thorough intermingling or diffusion of the chemical with the water before the water leaves the supply-pipe and is discharged into the filtering-chamber.

Still another defect in filters lies in the means employed to cleanse the water-chamber below the filter-bed. It is well-known that slime and other impurities of the water accumulate in this chamber and cling to the bottom of the support for the strainer, the bottom of the strainer, and the walls of the water-chamber with such tenacity that they cannot be removed by flushing, and consequently more or less of these impurities remain in the water-chamber until the filter is taken apart for repairs or for a thorough cleansing of all the parts. To keep this important part of the filter clean, I provide a pipe arranged in the chamber to deliver water in jet-streams with such force as to cut the slime from the parts enumerated and thoroughly cleanse the water-chamber.

With the foregoing purposes in view I will proceed to describe my invention, in connection with the accompanying drawings, which form part of this specification, and in which—

Figure 1 represents a side elevation with the lower part of the filter broken away; Fig. 2, a top plan view; Fig. 3, a vertical section; Fig. 4, a plan on the line $x\ x$ on Fig. 3; and Fig. 5 a horizontal section on line $z\ z$, Fig. 1.

Reference being had to the drawings and the letters thereon, A indicates the base, B the middle section, and C the top section of the filter. In the base is a water-chamber $a$, which receives the filtered water, and is provided with a concave bottom $b$, a discharge-pipe $c$ for clear water, a discharge-pipe $d$ communicating with the lowest part of the bottom to discharge the contents of said chamber when cleansing it, and a supply-pipe $e$, provided with numerous perforations $f$, to deliver the water in jet streams with such force as to cut the slime and other impurities off the walls of said chamber and off the bottom of the strainer and its support.

D indicates a support for the strainer E, and is preferably composed of a series of bars forming a grate, which is supported at its periphery in a rabbet $g$ in the base A, and above the strainer is a grated pebble-receptacle F, provided with a peripheral rim $g'$ and a series of separated chambers or cells $h$, which hold or retain the pebbles in position on the strainer when the current of water is reversed to cleanse the filter-bed. The chambers $h$ are of uniform depth (about two inches) throughout the area of the receptacle and are filled with pebbles $i$, upon which the granular filter-bed G rests. The pebble-receptacle is secured in position by a rabbet $k$, in the lower end of the section B, and prevents the strainer E being raised from its support D and sand getting between the strainer, the pebble-receptacle, and the support when the current of water is reversed.

To loosen the filtering material from the wall of the filtering-chamber H an agitator is provided, which consists of a spiral blade I, secured to the shaft $l$ by arms $m$, and is of a diameter nearly equal to the inner diameter of the section B or the filtering-chamber H, so that as the agitator is revolved when the filter-bed is being cleansed the blade shears off any portion of the filtering material that may have adhered to and incrusted upon the inner surface of the wall of the filtering-chamber. The spiral blade is of a height approximately equal to the depth of the filtering-chamber H, so that the entire wall of the chamber is kept free from incrustation. The shaft $l$ is supported at its lower end in a step $n$, and is provided with a stuffing-box $o$ in the top section C and with a crank $p$ by which the agitator is revolved.

In the section C is a chamber K to receive a suitable chemical, such as alum, to coagulate the impurities contained in the water, and the chamber is supplied with water by a branch $q$, communicating with the main supply-pipe L, and the water charged with the coagulating chemical is conducted from the chamber K through a pipe $r$, which enters the delivery-pipe $s$ within the filter and is provided with a series of perforations $t$, through which the water from the chamber K is discharged into the inflowing water to be filtered and permeates the body of the column of the water before it leaves the delivery-pipe.

To secure the most thorough commingling of the coagulant with the inflowing water while in the delivery-pipe, the pipe $r$ is provided on its outer surface with projections $u$ to break the steady flow or body of the column of water and causes the two bodies of water to be so thoroughly diffused that the coagulant will permeate every part of the inflowing water before it reaches the filtering-chamber H, in which it becomes so quiet or static that no perceptible commingling of the coagulant with the body of water occurs. This thorough commingling of the coagulant with the water in the delivery-pipe is especially necessary under rapid filtering, when but little time is allowed for the water to remain on top of the filter-bed. The quantity of the chemically-charged water is regulated by a valve $v$.

M indicates an overflow-pipe used to carry off the impure water when the filter-bed is being cleansed, and is provided with a valve $v'$, and N a connection with the supply-pipe L for conducting water to the chamber $a$ in the base A of the filter. The pipe $s$ is provided with a valve $w$ and the pipe N with a valve $y$.

O indicates a petcock to test the quality of the chemical in the chamber K.

To supply water for filtering, the valves $y$ and $v'$ are closed and the valves $w$ and $v$ are opened, when the water will flow into the filtering-chamber and be drawn off from the chamber $a$ through pipe $c$.

To cleanse the filter-bed, the valve $v$ is closed and the valves $y$ and $v'$ opened, when the water will flow up through the filter-bed while in a state of agitation and the impure water flow off through pipe M.

To clease the chamber $a$, the valves $w$ and $v'$ are closed and the valve $y$ and the valve of the discharge-pipe $d$ opened, when the water will be discharged in jet streams through pipe $e$ and flow off readily through pipe $d$, which is of sufficient area to prevent the chamber $a$ filling with water and interfering with the cutting effect of the jet streams from the perforations $f$ in said pipe $e$.

Having thus fully described my invention, what I claim is—

1. In a filter, the combination of a strainer, a support for said strainer, a grated pebble receptacle above the strainer and provided with a series of separate open chambers containing pebbles, and a filter-bed above and resting upon said pebbles.

2. In a filter, a grated pebble receptacle having a peripheral rim and provided with a series of separate chambers of uniform depth and open at both ends, whereby the pebbles are prevented being displaced in cleansing the filter-bed.

3. In a filter, a grated or reticulated pebble receptacle having a peripheral rim and a series of separate chambers in the same plane and open at both ends and a strainer below said receptacle, in combination with a grated support upon which the strainer and the pebble receptacle rest.

4. In a filter provided with a granular bed, a revoluble spiral blade connected to a central shaft and constructed and arranged to loosen the filtering material from the wall of the filtering-chamber.

5. In a filter, the combination of a supply pipe, a chemical chamber, a pipe leading from the supply pipe to the chemical chamber and a pipe leading from the chemical chamber into the supply pipe and provided with perforations, and projecting surfaces.

In testimony whereof I affix my signature in presence of two witnesses.

JOHN M. DAVIDSON.

Witnesses:
D. C. REINOHL,
GEO. E. TERRY.